Figure 1:
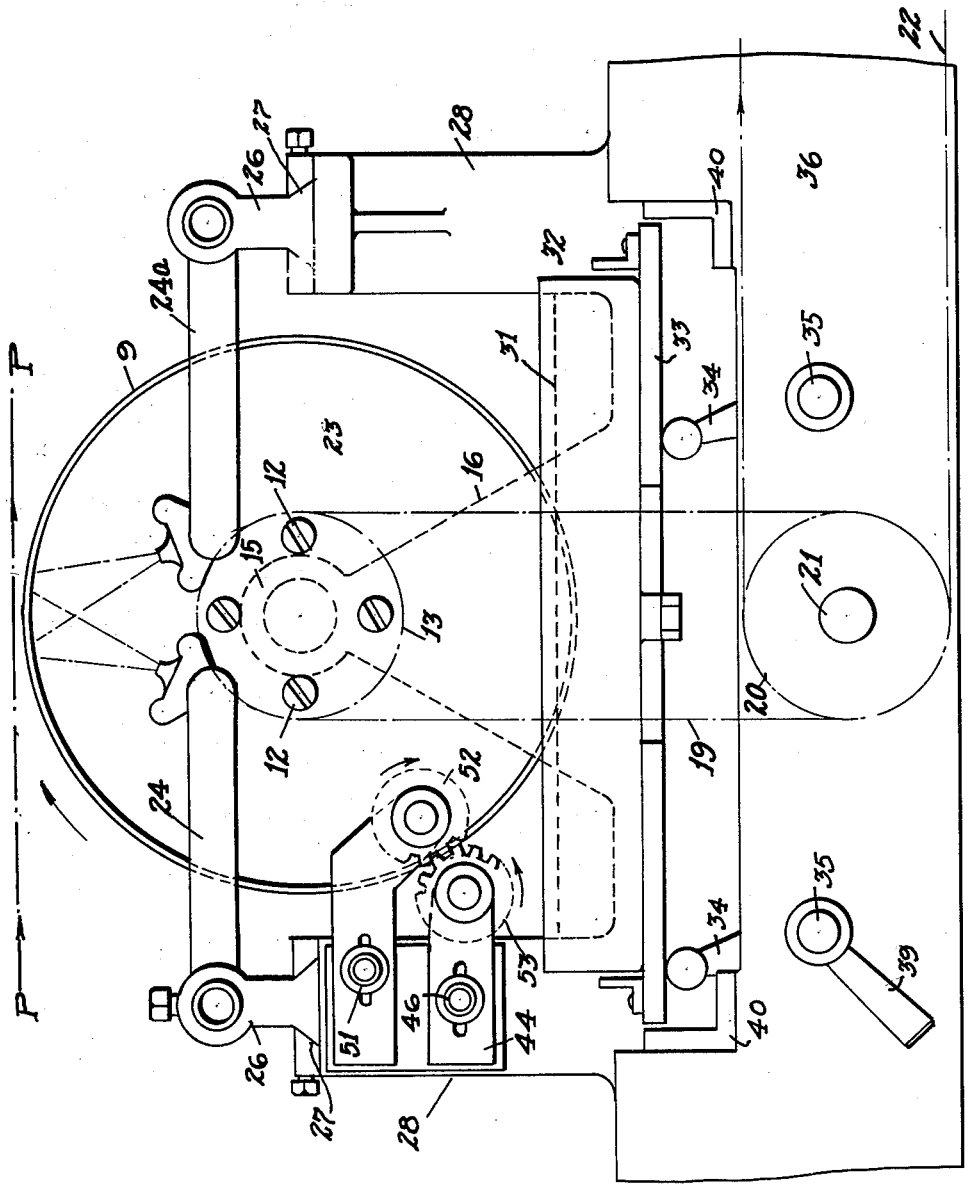

Aug. 27, 1963  D. H. BUSHEY  3,102,046
MANUFACTURE OF PRESSURE-SEALING ENVELOPES, BAGS, AND THE LIKE
Filed May 11, 1959  4 Sheets-Sheet 1

Inventor:
DONALD H. BUSHEY
by George H. Kennedy Jr.
Attorney

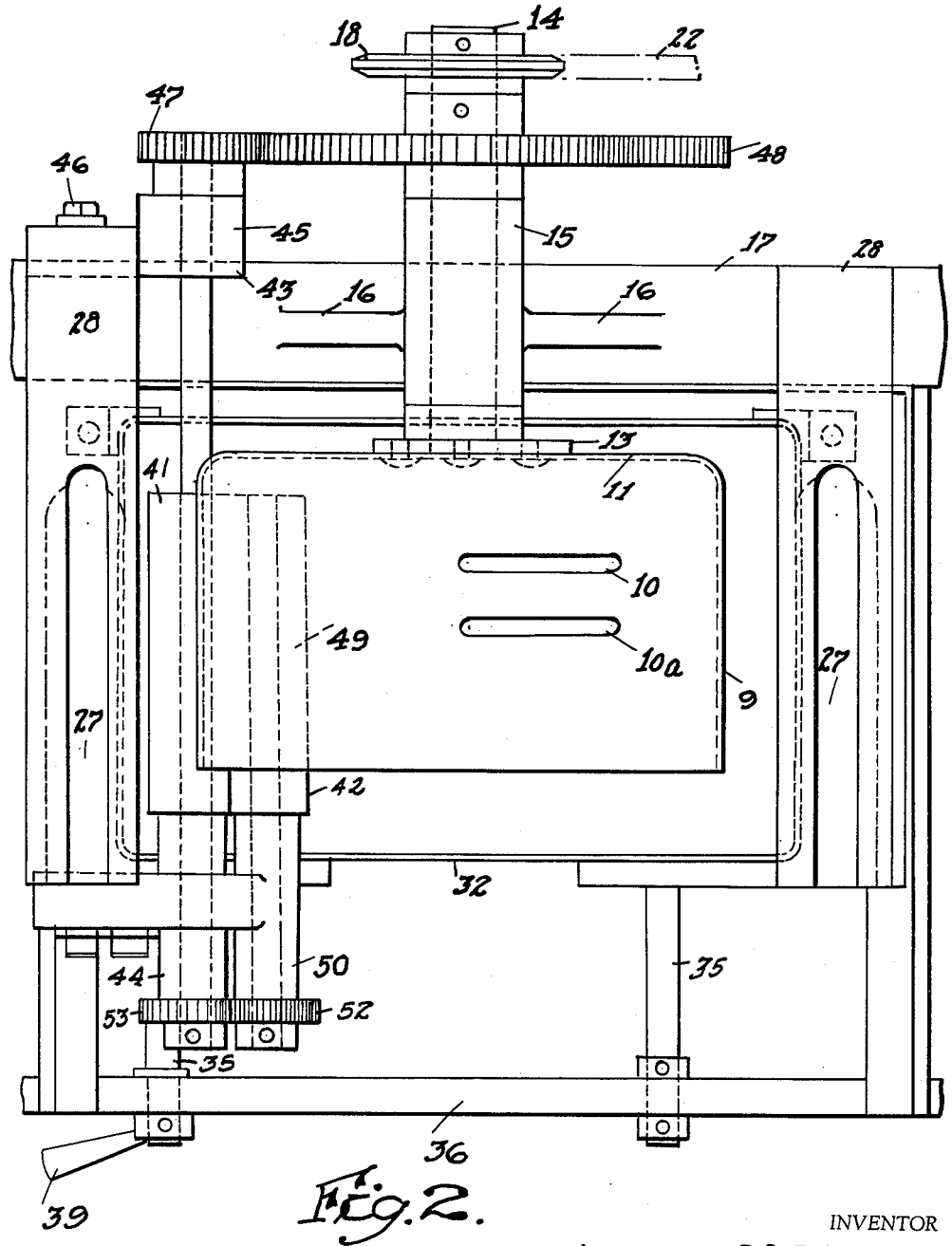

Aug. 27, 1963　　　D. H. BUSHEY　　　3,102,046
MANUFACTURE OF PRESSURE-SEALING ENVELOPES, BAGS, AND THE LIKE
Filed May 11, 1959　　　　　　　　　　　　　4 Sheets-Sheet 3
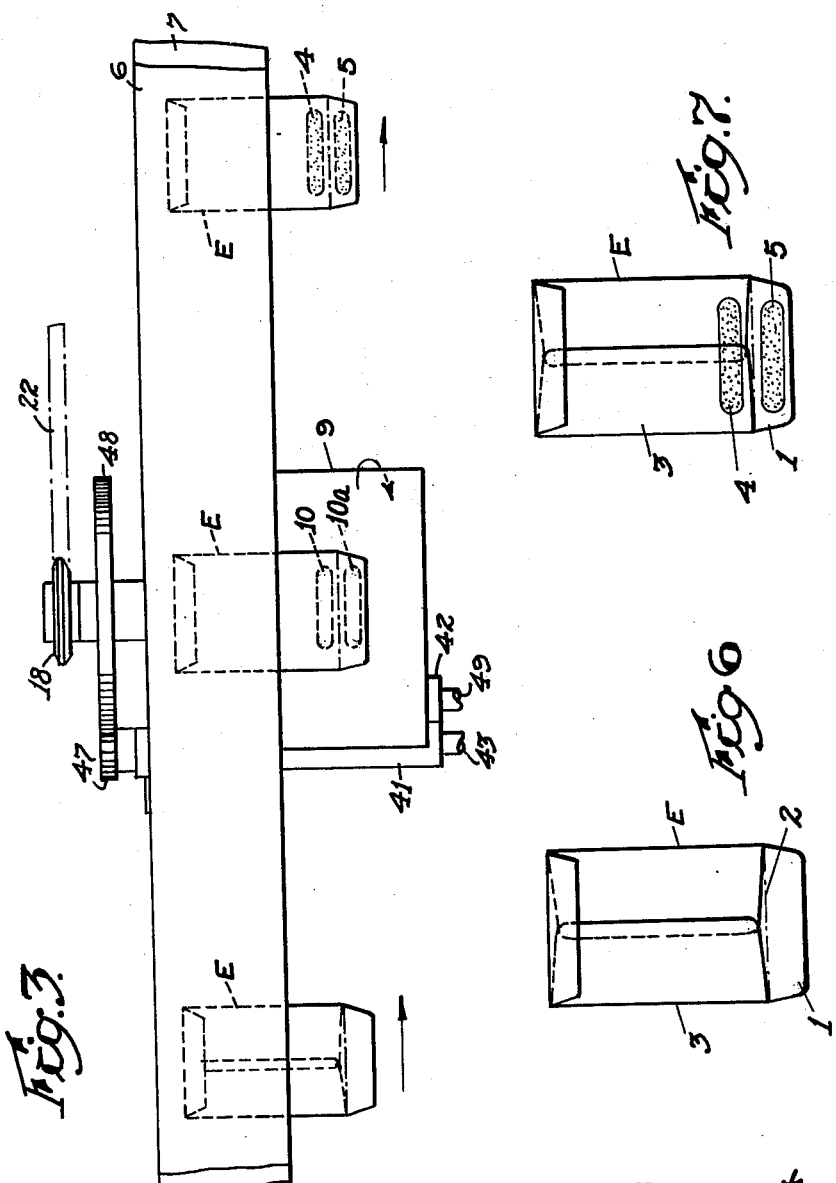
Inventor:
DONALD H. BUSHEY
by George H. Kennedy Jr.
ATTORNEY

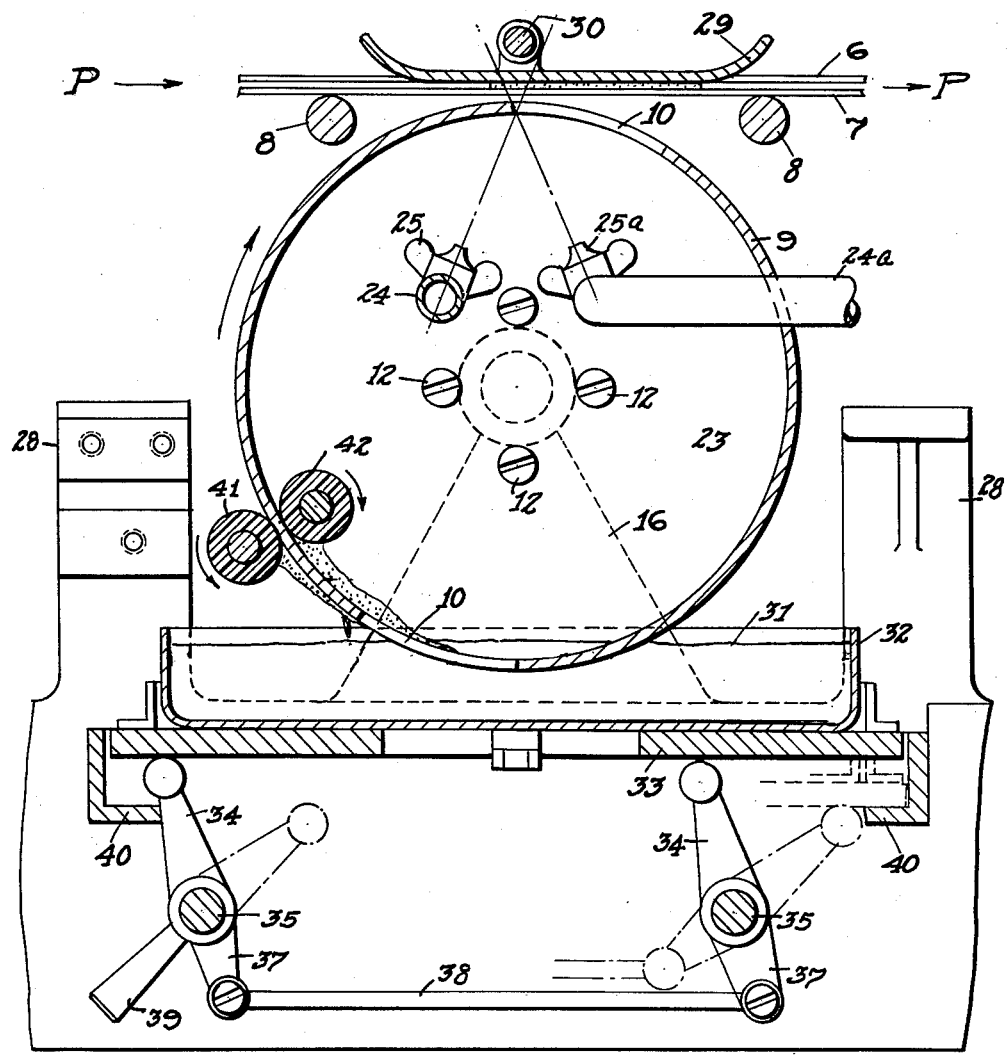
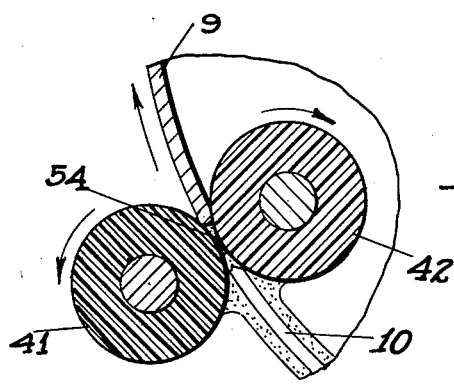

3,102,046
MANUFACTURE OF PRESSURE-SEALING ENVELOPES, BAGS, AND THE LIKE

Donald H. Bushey, Shrewsbury, Mass., assignor to United States Envelope Company, Springfield, Mass., a corporation of Maine
Filed May 11, 1959, Ser. No. 812,340
10 Claims. (Cl. 117—38)

This invention relates, in certain significant aspects, to the manufacture of pressure-sealing envelopes, bags, and other containers. More particularly, the invention relates to improved means and methods for forming on such and similar articles the complemental or matching films, essentially of rubber latex, by which their pressure or contact sealing or adhesion is secured.

As is well known, pressure-sealing envelopes do away entirely with the usual dried rewettable sealing glue or gum that ordinary envelopes carry on their closure flaps. Instead, for sealing purposes, these envelopes provide, usually on complemental areas of closure flap and envelope wall, a pair of substantially dry coatings or films of rubber latex. Since these latex films or coatings are strongly adherent to one another on contact, the envelope or other container can readily be sealed, merely by folding over and pressing down its closure flap, to contact the latter's latexed area with the matching latexed area of the envelope's wall.

Standard practice in the manufacture of all types of pressure sealing envelopes, is to provide these latex films by coating each selected area of closure flap and wall material with an emulsion-like liquid mixture whose principal ingredients are rubber latex and a relatively-volatile alkaline liquid—usually ammonia water $$(NH_4OH)$$

without which the latex, upon exposure to air, will quickly coagulate. Then, by suitable heating and drying of the so-coated envelopes, most of the water and other volatile components of these wet coatings are driven off, leaving relatively dry latex films that are adherent only to each other.

By reason of the very strong coagulative tendencies of rubber latex, the latex-containing liquid mixtures which provide these film-forming coatings are of peculiar consistency and relatively unstable viscosity. Because of this, conventional rotary glue applicators extensively used in envelope making for depositing limited-area imprints of ordinary wet glue on advancing envelopes or envelope blanks, are never able to deposit satisfactory film-forming imprints from these latex-suspending liquid mixtures. This fact is very well known in the envelope making industry. According to Skow United States Patent No. 2,709,951, dated June 7, 1955, the latex content of any such liquid mixture distintegrates, when pressed between the rolling surfaces of a rotary applicator and its associated platen roller. According to Sackett et al. United States Patent No. 2,748,025, dated May 29, 1956, all so-deposited latex-containing imprints tend to develop bubbles and voids, which prevent any adequate and complete sealing of the envelope. According to Winkler et al. United States Patent No. 2,821,161, dated January 28, 1958, these so-deposited latex-containing imprints are never of the desired thinness, and are actually so thick in certain spots that an air blast must be used to level them off, in advance of the drying operation.

Such defects and irregularities of these latex containing imprints, made by conventional rotary applicators or dies, for film-forming purposes on advancing envelope material, have markedly bad effects, not only on the quality and salability of the end products (pressure sealing envelopes) but also on their cost of manufacture. With all such latex containing imprints that are appreciably thicker in some places than in others, an extra expenditure of heat is always required for their drying, to insure against any "re-tack" of the resulting film's thicker portions with unlatexed areas of adjacent envelopes in a stack or pile. This extra heating is practically certain, in every case, to seriously impair (by over-drying) the adhesive properties of thinner portions of the resulting latex films. In any event, nearly all of such resulting latex films are unsightly, since they exhibit when dry substantially the same high and low surface irregularities as the wet latex containing imprints from which they result. Moreover, when a pair of latex films resulting from such irregularly-surfaced imprints are disposed in pressure sealing relation, they will contact and adhere to each other only at their higher or thicker portions. In short, full area contact (the optimum condition for pressure sealing), is rarely, if ever, achieved between latex films that result from individual imprints of latex containing liquid mixtures that are made on advancing envelopes or envelope materials by rotary applicators or dies.

As a substitute for this very unsatisfactory imprinting of film-forming latex coatings, it has heretofore been proposed (see British Patent No. 444,502 of March 23, 1936) to obtain these film-forming coatings by compressed air spraying of the latex containing liquid onto the selected areas of successive advancing envelopes. Under this proposal, the sprayed latex liquid is limited to the selected envelope areas by a stationary mask, having spray-passing apertures whose edges define said areas, such that all other portions of the sprayed liquid are intercepted by the mask's surface. An outstanding difficulty with this proposal is that the latex content of all such intercepted spray quickly coagulates upon the mask's surface and upon the edges of its spray-passing apertures. This results in a rapid build-up on the mask of ever-thickening and hardening layers of latex accretions, which in a very short time will spread irregularly into edge areas of the mask's spray-passing apertures, with very bad effect on the size, appearance and regularity of outline of the spray latexed areas of the passing envelope material.

I have discovered that these and other difficulties in the spray latexing, for pressure sealing purposes, of envelope, bag or other container material, can be overcome by what may be termed a wet-mask method of latex spraying. According to my invention, the latex spray, produced in conventional fashion by compressed air, reaches the successive selected areas of advancing envelope, bag or other container material through appropriately shaped apertures of a spray-intercepting masking device, disposed in close proximity to the path of said areas. This mask is so moved that it intercepts all of the excess spray, and keeps same entirely away from all other envelope areas, as well as from all other parts of the apparatus.

Also, according to my invention, all such excess spray, as soon as intercepted by the mask, is plunged by said mask's movement into a suitable liquid bath. Thus all of the spray received on the mask is quickly cut off from any exposure to the air, so that no coagulation of such spray's latex content on said mask or along the edges of its apertures, can ever take place. The mask's passage through this liquid bath so increases the wetness and liquidity of the mask's intercepted spray as to inhibit its coagulation on said mask; furthermore, this wetting action facilitates the progressive wiping from said mask of any excess spray, along with any excess picked-up bath liquid, by the action of suitable mask wiping devices, which are effective, beyond said bath, on both sides or surfaces of the mask.

Furthermore, according to my invention, these mask-wiping devices are so constructed as to operate effectively within the spray-passing apertures of the mask, for thorough recurrent wipe offs of said apertures' edge areas. This gives assurance that the sprayed latex emulsion coatings on successive selected envelope areas will have borders or edges of the utmost sharpness and regularity.

Other and further objects, advantages and features of my invention will become apparent from the following detailed description thereof, taken in connection with the accompanying illustrative drawings, in which FIG. 1 is a view in front elevation of an arrangement of apparatus, in accordance with my invention, for producing uniform spray coatings of latex emulsion on selected areas of advancing envelope material.

FIG. 2 is a top plan view, with certain parts removed, of the apparatus shown in FIG. 1.

FIG. 3 is a smaller scale diagrammatic plan view, showing the relation of said apparatus to the path traversed by the successive selected areas of envelope material.

FIG. 4 is a vertical sectional view, showing the spraying, spray masking, mask-wetting and mask-wiping devices of my invention.

FIG. 5 is a fragmentary larger scale sectional view, illustrating the clean-off action performed, according to my invention, on the spray-passing apertures of the moving mask.

FIG. 6 shows an envelope's rear face and closure flap, before spraying of same by my invention.

FIG. 7 shows the same envelope's rear face and closure flap, after same have been sprayed, according to my invention, with the latex emulsion.

Like reference characters refer to like parts in the different figures.

The drawings show my invention as operating on successive advancing open end envelopes E, E, each having (see FIG. 6) an extended closure flap 1, which, after loading of the envelope, is foldable over, on score line 2, against the enevlope's seamed rear wall 3. My invention gives to each envelope E, on its rear wall 3 and on its extended closure flap 1, the matching limited-area spray coatings of rubber latex shown at 4 and 5 respectively in FIG. 7. These spray coatings 4 and 5, after the usual heating and drying, provide complemental latex films, of the desired uniform thinness, for the pressure sealing of each so-sprayed envelope.

As herein shown, sucessive envelopes E, E receive their pairs of latex spray coatings 4, 5 while being advanced flatwise along a path P, such that their spray receiving wall and closure flap areas, facing downwardly, pass directly over the latex spraying and spray masking instrumentalities that are shown by FIGS. 1, 2 and 4. For so advancing the successive envelopes E, E, their lower or body portions (see FIG. 3) are here shown as firmly gripped between parallel opposed belt courses 6 and 7, which move in unison from left to right. Belt course 6 is the lower course of an upper endless traveling conveyor belt, and belt course 7, suitably supported against sagging at 8, 8 (see FIG. 4) is the upper course of a lower endless traveling conveyor belt. Obviously, any similar conveying means, such as closely-spaced pairs of upper and lower conveyor rollers, may be employed for advancing the successive envelopes E, E in regular order, along the path P.

By such conveyor movement, each envelope's downwardly facing spray-receiving areas are moved across an underlying suitably-apertured spray-masking device 9, in close but nontouching proximity to the latter's outer surface. As herein shown, this masking device 9 is a hollow cylindrical member, providing a pair or pairs of adjacent apertures 10, **10*a*, which, by said member's rotation, are moved periodically into and out of alinement with each passing envelope's selected areas, for access to the latter of upwardly-directed latex emulsion sprays. Quite obviously, this masking device 9**, instead of being a revolving hollow cylinder, could as well be a similarly-apertured traveling endless belt or band.

In that case, one course of such travelling apertured masking belt or band would be substantially parallel to but slightly spaced from the path of the advancing envelopes, for latex spraying of the latter's selected areas by a spray or sprays directed at said course.

The illustrated hollow cylindrical masking device 9 has a closed rear end 11, to which is centrally secured, by screws 12, 12, a flange or enlargement 13 on the front end of said mask's horizontal supporting and driving shaft 14. Said shaft 14 is suitably journaled in an elongated bearing sleeve 15, here shown as provided by an upward extension 16 of the apparatus's rear horizontal support or frame member 17. To the rear end of shaft 14 is secured a sprocket 18, driven by a sprocket chain 19 (see FIG. 1) from a sprocket 20 on the apparatus's main actuating shaft 21.

This main shaft 21 has a suitable sprocket chain drive, as shown at 22 in FIGS. 1 and 2, connecting it with the actuating devices (not shown) of the envelope-conveying belt courses 6 and 7, such as to synchronize the speed of rotation of masking device 9 with the speed of advance of the successive envelopes E, E. It will be understood that the surface speed of the apertured masking device, whether same be rotary, as shown, or of endless belt form, corresponds to the speed of advance of the passing envelopes E, E. By the same token, the spacing of said mask's pairs of spray-passing apertures 10, **10*a* (there being two such pairs of apertures in the illustrated masking device 9) corresponds to the spacing apart of the successive envelopes E, E, in the travel of their spray-receiving areas past the masking device. This insures the alinement of all such areas with the mask's spray-passing apertures 10, 10*a***.

The front end of masking device 9 is open, this affording unobstructed access to its interior space 23. Entering this space from the front are a pair of bent tubular elements 24, **24*a*, which support and communicate with suitable upwardly pointed spray nozzles 25, 25*a* at their rear or inner ends. These nozzles serve for the upward jet discharge of latex emulsions in atomized spray form. Equipment for air pressure spraying of latex containing liquid mixtures is old and well known in the spraying art, and such equipment is commercially available from The De Vilbiss Company, and other suppliers. Thus a detailed description of the nozzles 25, 25*a* and their appurtenant and accessory devices is not necessary. It is sufficient to point out that one spray nozzle 25 is substantially alined with the path of the rearward mask aperture or apertures 10, while the other spray nozzle 25*a* is substantially alined with the path of the front mask aperture or apertures 10*a***.

Each of the nozzle-supporting tubular elements 24, **24*a* is carried (see FIG. 1) by a suitable holder 26. These holders 26, 26 are mounted, for sliding fore and aft adjustments, in suitable gibs or guideways 27, 27 provided by upstanding transverse frame or support members 28, 28. By such means the nozzles can be accurately positioned, for use with other similar masking devices 9**, having spray-passing apertures of different size, shape or spacing from those herein illustrated.

It will be understood from the foregoing description that the latex containing sprays as continuously discharged toward the path of the envelope material, get through the masking member's apertures only onto the passing selected rear wall and closure flap areas of said material. It will further be noted that these spray-receiving envelope portions are not unduly deflected or displaced by the impingement thereon of the latex containing spray jets. This is because said envelope portions, at these particular times, are passing beneath a suitable stationary shoe 29 (see FIG. 4) which is supported substantially in the plane of the upper belt course 6, by an overhanging rod member 30, attached to any part of the apparatus' frame or support.

All of the excess portions of these upwardly directed air-latex spray jets are continuously intercepted by the inner surface of the rotating mask 9. But my invention gives no opportunity for this intercepted spray either to accumulate and/or to coagulate on the mask. This is because all such excess spray, as soon as intercepted by the mask, is plunged by the mask's rotation into a suitable liquid bath 31, wherein is at all times submerged (see FIG. 4) the lower portion of the rotating mask 9. Since all of said mask's intercepted spray, by this prompt submergence in liquid 31 is very quickly cut off from exposure to the air, there is no tendency nor opportunity for any of said spray's latex content to coagulate, either on the mask's inner or outer surfaces, or on the edge areas of its spray-passing apertures 10, 10*a*.

Instead, all of this intercepted latex spray on the rotating mask 9 has its wetness and liquidity so very markedly increased by immersion in the bath of liquid 31, that wipe-off of its excess portions from mask 9, and its drain back into bath 31, are readily secured by a novel mask-wiping operation, as will hereinafter be described. The liquid of bath 31, for this prompt and thorough wetting of and amalgamation with the spray particles adhering to the mask 9, may well be the same liquid latex mixture (essentially rubber latex and ammonia water) that is used for the spray. If desired, this latex containing bath liquid may be diluted periodically or continuously with water and/or with ammonia water (the usual coagulation inhibitor), to prevent its undue thickening without imposing any handicap on the recovery of the mask-intercepted latex that is gradually added to the bath. If latex recovery is not desired, the bath may be any suitable liquid which thoroughly wets and is readily miscible with the intercepted latex spray particles which collect on rotating mask 9.

The body of spray-wetting liquid 31 is here shown as contained in a suitable pan or receptacle 32, underlying the rotary mask 9, and resting on a vertically-movable shelf or plate 33. The latter is supported in the operative mask-submerging position shown in FIGS. 1 and 4 by the upper ends of a pair of spaced-apart parallel frames 34, 34, which extend upwardly from a pair of transverse shafts 35, 35 having pivotal mountings in the rear frame member 17 and also a front frame member 36 of the apparatus. Said shafts have parallel downwardly extending arms 37, 37, connected by a link 38, to insure their rocking movements in unison. One shaft 35 extends through the frame member 36 and carries a suitable hand lever 39, whose clockwise turning procures a lowering of the shelf or plate 33 onto suitable underlying transverse supporting ledges 40, 40 provided by the fixed framework of the apparatus. This allows pan 32, for dumping and cleaning purposes and/or replenishment of its liquid, to be pulled out forwardly from the apparatus, without any encounter or obstruction of its sides or rim by the overlying mask 9.

The above-mentioned mask-wiping operations are continuously performed by two parallel slightly spaced rolls 41 and 42, both of soft rubber, or other resilient and yieldable material. These rolls 41 and 42 are maintained in close rolling contact with the outside and inside surfaces, respectively, of the rotating mask's shell or hollow cylindrical portion, in the region of the latter's emergence from the spray wetting liquid in pan 32.

As herein shown, the outer wiping roll 41 is secured to an elongated transverse shaft 43, rotatably mounted in suitable front and rear bearing blocks 44 and 45 respectively. These have support portions which are secured, for limited lateral adjustment, as shown at 46 in FIGS. 1 and 2, to the opposite ends of the left-hand frame upright 28. The rear end of outer roll shaft 43 carries a pinion 47, which meshes with a large gear 48 secured to the shaft 14 of mask 9. The other or inner wiping roll 42 is secured to a much shorter shaft 49, whose mounting for rotative movement is provided by a single elongated bearing block 50. This has a support portion which is secured, for limited lateral adjustment, as shown at 51, FIG. 1, to the front end of the left-hand frame upright 28.

The front end of the inner roll shaft 49 has secured thereto a pinion 52, which meshes with and is driven from a pinion 53 secured to the front end of the outer roll's shaft 43. Thus it is that both of these wiping rolls 41 and 42, one on the outside and the other on the inside of rotary mask 9, are driven in unison but in opposite directions, as shown by the arrows in FIGS. 4 and 5, so that the surface of each wiping roll is moving in the same direction and at the same surface speed as the mask surface which it contacts. Because of this, the "pinch" of these rolls 41 and 42 on the interposed material of the mask does not interfere in any way with the mask's rotation in step with the advancing envelope material.

On the other hand, by virtue of such "pinch," the inner wiping roll 42 cleans off the thoroughly wetted spray on the mask's inner surface, and both rolls serve continuously as effective dams or barriers, which block off and drain back into the liquid of the underlying pan 32, any excess of such liquid which both mask surfaces pick up, by their movement through the spray wetting liquid 31. This assures that both the inside and outside surfaces of the mask, in their approach to the region of the upwardly directed latex containing sprays, will at all times be relatively clean, with only very thin and light layers of the dilute wetting liquid 31 thereon. This slight wetness of the mask's inner spray intercepting surface makes it all the easier for the spray to be wiped off, as above described, from the mask.

Furthermore, it is very advantageous, by slight lateral adjustments of the respective roll bearings at 46, 46 and 51, to so increase the "pinch" on mask 9 of these wiping rolls 41 and 42, that the latters' yieldable material will be more or less compressed by the intervening mask material. Under these conditions, when the mask's apertures 10, 10*a* are passing between the rolls 41 and 42, the latter's surface portions, as shown at 54 in FIG. 5, will tend to bulge out appreciably into the passing mask apertures. This action provides, from both sides, a thorough wipe off of the edge areas of said apertures, and is an effective deterrent against any accumulation and/or coagulation along said edge areas of the latex content of the sprays. It will be clear from the foregoing that my invention, by virtue of spraying the latex, rather than imprinting it, on the selected envelope areas, obtains film-forming coatings of the utmost uniformity throughout. When such coatings are dried they become pressure sealing latex films of optimum uniform thinness, such that full area contact between them, for pressure sealing purposes, is always secured. Moreover, the above described recurrent wipe-offs of the mask apertures' edges gives assurance that the sprayed latex coatings 4 and 5 (FIG. 7) of the successive envelopes E, E will have borders or edges of the utmost sharpness and regularity.

I claim:

1. In the manufacture of pressure sealing envelopes, bags or other containers, wherein uniform continuous film-forming coatings of rubber latex are produced on selected areas of advancing container material by air pressure spraying of a liquid latex-containing mixture including a volatile anti-coagulant for the latex through wide open mask apertures corresponding substantially in size and shape to the material areas destined to be latex coated, the improvement which consists in moving the so-apertured mask, synchronously with the material's advance, such that it intercepts all of the so-sprayed liquid mixture except the portions which pass through said apertures onto said selected areas, and using said mask's movement to recurrently pass said mask and its intercepted spray through a body of wetting liquid which is miscible with said spray and devoid of any coagulative effect upon latex, whereby to maintain said mask and the spray thereon in a condition of such wetness as to prevent any appreciable coagulation on said mask of the rubber latex content of said intercepted spray.

2. A wet mask latex-spraying method as recited in claim 1, in which the body of mask-wetting liquid is of substantially the same composition as the latex-containing liquid mixture of the spray.

3. A wet mask latex-spraying method as recited in claim 1, in which the body of mask-wetting liquid contains an alkaline liquid anti-coagulant for rubber latex.

4. A wet mask latex-spraying method as recited in claim 3, in which the liquid anti-coagulant of the mask-wetting liquid is ammonia water.

5. A wet mask latex-spraying method as recited in claim 1, in which the mask's movement also procures progressive removal therefrom of excess wetted spray and excess portions of the picked-up wetting liquid.

6. Apparatus for the manufacture of pressure sealing envelopes, bags and other containers by producing film-forming coatings of rubber latex on selected areas of advancing container material, including means for conveying the container material along a predetermined path, air pressure spraying means adjacent said material path by which a liquid latex-containing mixture that includes a volatile anticoagulant for the latex, is sprayed toward the passing container material, an apertured masking device and means for moving said masking device synchronously with said material's advance in a closed path that passes between said spraying means and the advancing material, such that said masking device intercepts all of the so-sprayed liquid mixture except the portions of same which pass through its aperture or apertures onto the selected areas of the passing container material, in combination with means for preventing appreciable coagulation on said masking device of the latex content of all such intercepted spray, said last-named means comprising a tank containing a body of liquid miscible with said spray and devoid of coagulative effect upon latex, and means for submerging the lower portion of the so-moving masking device in said liquid, into what by said device's movement the intercepted spray is plunged, and from which liquid said device's spray intercepting surfaces emerge and move through the spraying zone in a condition sufficiently wet with said liquid as to nullify the normal tendency of the intercepted spray's latex content to coagulate on said surfaces.

7. Apparatus as recited in claim 6, in which the masking device is a rotating hollow cylinder containing the spraying means, and is open at one end for access to its interior of the body of wetting liquid.

8. Apparatus as claimed in claim 6, which includes a pair of parallel rolls of yieldable material, wiping against the inside and outside surfaces of the masking device, in the region of its emergence from said body of wetting liquid.

9. Apparatus as claimed in claim 8, which includes means for imparting rotation to said wiping rolls in directions corresponding to the movement of the respective masking device surfaces contacted thereby.

10. Apparatus as claimed in claim 8, which includes means for so compressing the material of said wiping rolls that it tends, upon arrival of any masking device aperture or apertures between said rolls, to bulge into said aperture or apertures.

References Cited in the file of this patent

UNITED STATES PATENTS

| | | |
|---|---|---|
| 746,786 | Burdick | Dec. 15, 1903 |
| 1,701,568 | Hubl | Feb. 12, 1929 |
| 2,119,043 | Cornelison | May 31, 1938 |
| 2,313,650 | Loewengart | Mar. 9, 1943 |
| 2,736,290 | Scholl | Feb. 28, 1956 |
| 2,740,375 | Diehl et al. | Apr. 3, 1956 |
| 2,792,780 | Jacob | May 21, 1957 |

FOREIGN PATENTS

| | | |
|---|---|---|
| 444,502 | Great Britain | Mar. 23, 1936 |